United States Patent Office 2,785,819
Patented Mar. 19, 1957

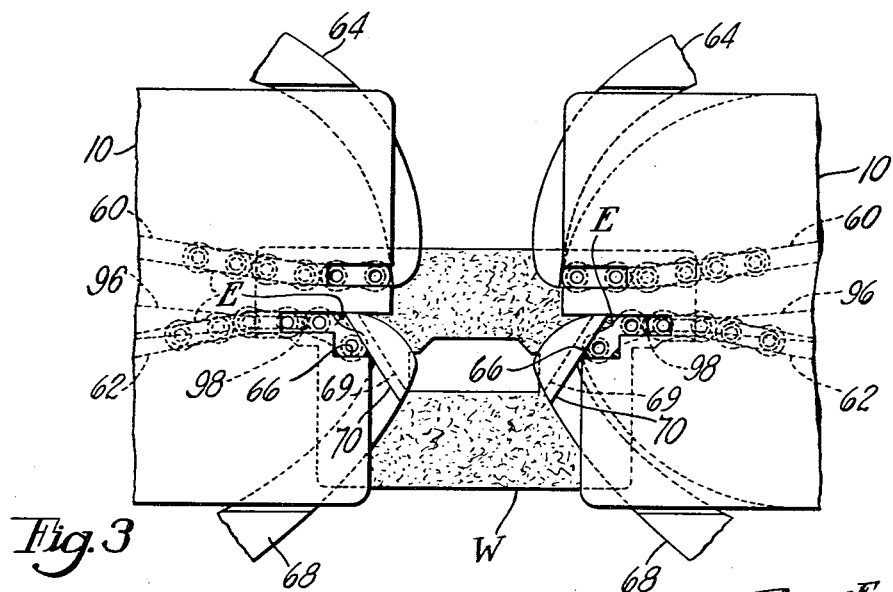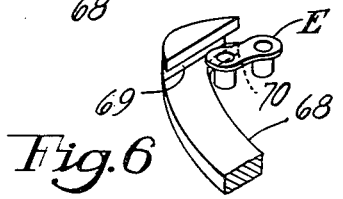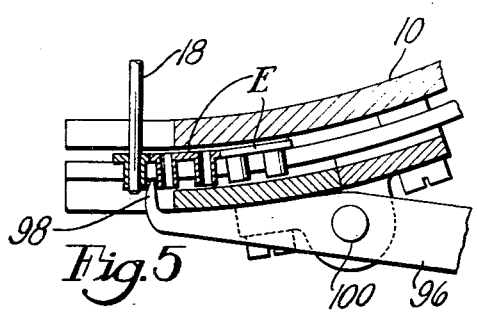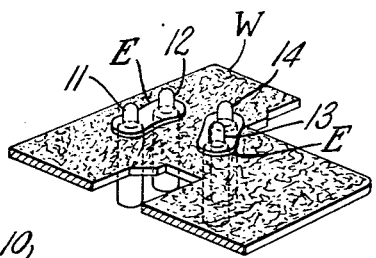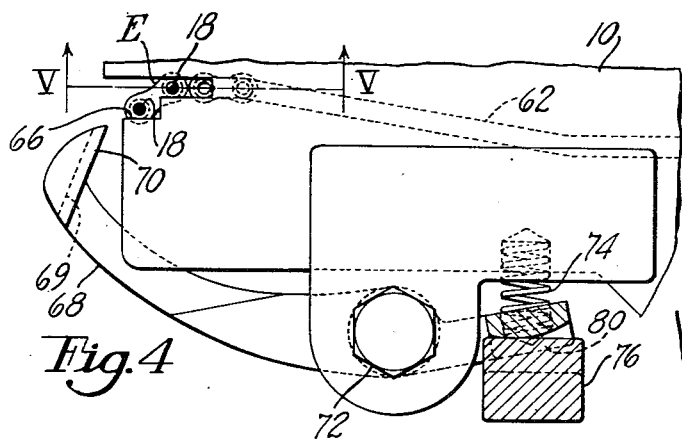

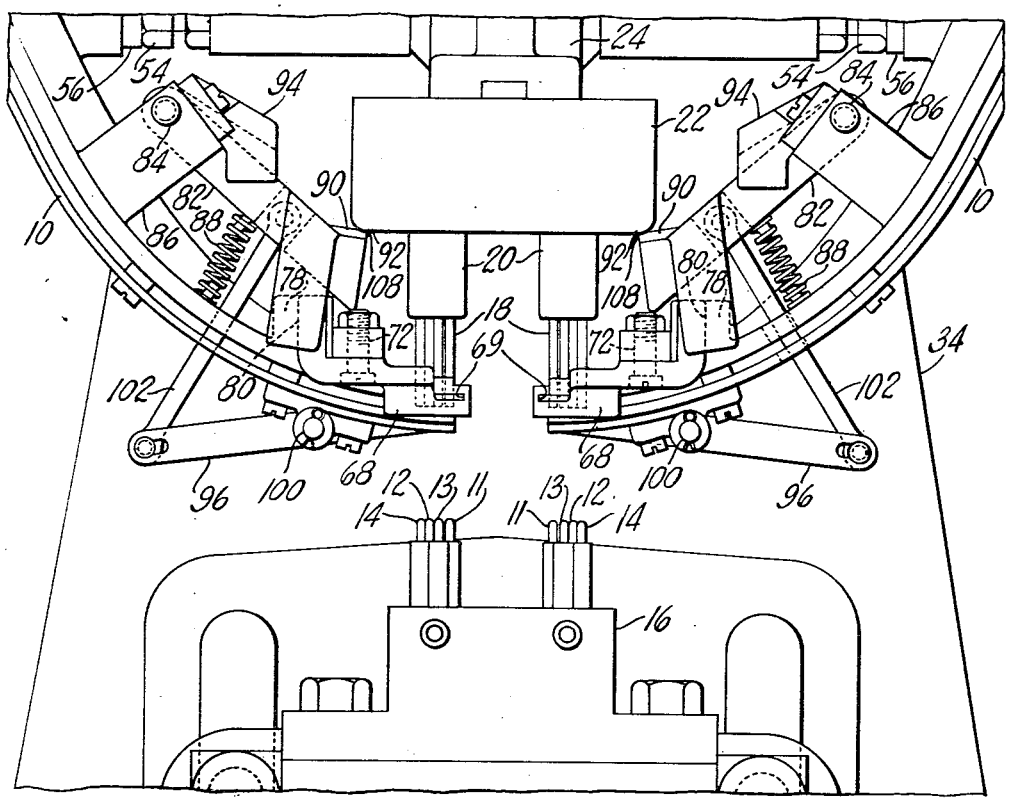
Fig. 7
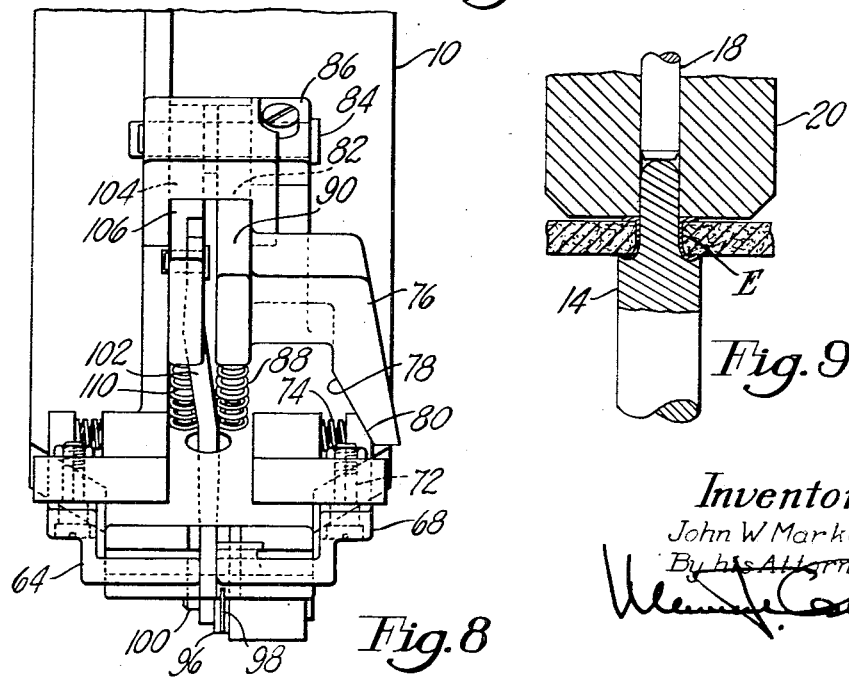
Fig. 8
Fig. 9
Inventor
John W Markey
By his Attorney

2,785,819

MACHINES FOR INSTALLING TUBULAR FASTENERS IN ANGULAR RELATION

John W. Markey, Beverly, Mass., assignor to United Shoe Machinery Corporation, Flemington, N. J., a corporation of New Jersey Application September 9, 1953, Serial No. 379,245

6 Claims. (Cl. 218—.5)

This invention relates to machines for installing a plurality of tubular fasteners, and more particularly to machines for installing at substantially the same time two or more of these fasteners having small throats and respectively provided with portions extending laterally and with their lateral portions in predetermined angular relation. As herein illustrated the invention is shown as applied to a machine for simultaneously inserting a plurality of so-called double barreled eyelets, the adjacent elongated bodies of which must be located in a workpiece in predeterminately fixed angular positions with respect to one another. It is to be understood, however, that in various novel aspects the invention is not limited to a machine of the construction shown and that application of the invention is not restricted to eyelets having elongated bodies but it may be readily adapted for use with grommets or other tubular members, such as single-barreled electric contacts for example, provided with extending portions and requiring orientation with respect to each other.

In the usual machine for inserting tubular fasteners an oscillatory raceway unit is provided with a track for delivering the fasteners one at a time to a cooperative pair of reciprocating fastener setting tools, the endmost fastener in the rack being held therein by a spring pressed pivotal finger mounted on the raceway until the fastener is impaled and then transferred, without reorientation of its barrel to the hole into which it is to be inserted. The pilot, spindle or impaling pin, after being thrust into the fastener barrel, is normally subjected to a sidewise stress by reason of the retraction of the raceway to clear the path of the tools for their upsetting movement. This is to say that in releasing the fastener to the impaling pin the latter bears on the fastener yieldingly to pivot the retaining finger away from the delivery end of the track. The consequent strain thus repeatedly imparted to the more slender impaling pins, especially those required for small-throated barrels of fasteners, tends to cause them to become bent and then broken.

It is accordingly an object of this invention to provide, in a machine for inserting tubular fasteners, which machine has an oscillatory raceway, a reciprocable impaling pin for transferring endmost fasteners therefrom one at a time, a retaining finger to hold the endmost fastener in the raceway until such transfer, and improved means for positively actuating said finger in time relation to the movements of said raceway and pin to relieve the latter of lateral stress.

Heretofore in fastener inserting machines fitted to deal with the problem of turning non-circular tubular fasteners about their respective axes prior to insertion, the turning movement has occurred after disengaging each fastener from the raceway or, as disclosed in United States Letters Patent No. 1,722,286, granted July 30, 1929, upon an application filed in the name of S. L. Gookin, orientation of each fastener has been attained by cooperation of the delivery end of the raceway and the impaling pin, the latter being there shown as having a non-circular cross section. While the earlier practices have generally proved satisfactory for the larger barreled fasteners and where a high degree of accuracy in locating the inserted fasteners was not an important factor, special consideration has been required in connection with installing with precision the millions of tiny barreled tubular fasteners or contacts now employed, for example, in electronics assemblages. In view of the conditions above described it is a further object of this invention to provide improved means, of simple structure, for controlling and angularly positioning predeterminately the elongated bodies of tubular fasteners, especially those of small size, as they are being transferred from a raceway to a setting tool for insertion.

To the ends stated, and as a feature of the invention, the machine herein shown has a raceway delivery end provided with a retaining finger movably mounted thereon for yielding engagement with an endmost fastener, a plunger for carrying a setting tool, and means actuated by said plunger for positively removing the retaining finger from the endmost fastener in the raceway track to clear it for transfer therefrom by an impaling pin without interference either before or as the raceway is retracted. Another feature of the invention resides in the combination with a raceway having its delivery end track portion offset for limiting the extent of angular swing to be given each endmost elongated fastener, of a retaining finger provided with a deflecting or guide surface adapted to extend into the raceway track to cooperate with said offset portion and the lead portion of the fastener in establishing the orientation of the latter. The deflecting formation thus required in the fastener engaging end of the retaining finger necessitates the latter having a freer throw in clearing the delivery end of the raceway and hence increases the desirability of having the finger actuated mechanically as above mentioned. It will be apparent that, in addition to the savings in time effected by simultaneous installation of the fasteners, accuracy in locating them uniformly close to one another is achieved by the machine afforded by this invention.

The above and other novel features of the invention will now be more particularly described in connection with an illustrative embodiment and with reference to the accompanying drawings thereof, in which Fig. 1 is a view in front elevation of a gang type eyeleting machine adapted for the simultaneous installation of a plurality of double barreled fasteners in a workpiece and in which the invention is embodied;

Fig. 2 is a view in perspective of one half of a workpiece with fasteners angularly positioned by the machine;

Fig. 3 is a plan view on an enlarged scale of the delivery ends of the raceways shown in Fig. 1 illustrating fastener deflecting fingers in the positioning stage of their operation;

Fig. 4 shows one of the fingers seen in Fig. 3 but at a subsequent position relative to an endmost fastener;

Fig. 5 is a section taken on the line V—V of Fig. 4;

Fig. 6 is a perspective view of a deflecting finger engaging a leading barrel portion of a fastener;

Fig. 7 is a front elevation on an enlarged scale of a part of the machine shown in Fig. 1;

Fig. 8 is a view in side elevation, as seen from the left in Fig. 7, of the lower end of the right-hand raceway; and Fig. 9 is an elevation, partly in section, showing on a magnified scale one barrel of a fastener being clenched by two cooperating setting tools.

Figure 1:
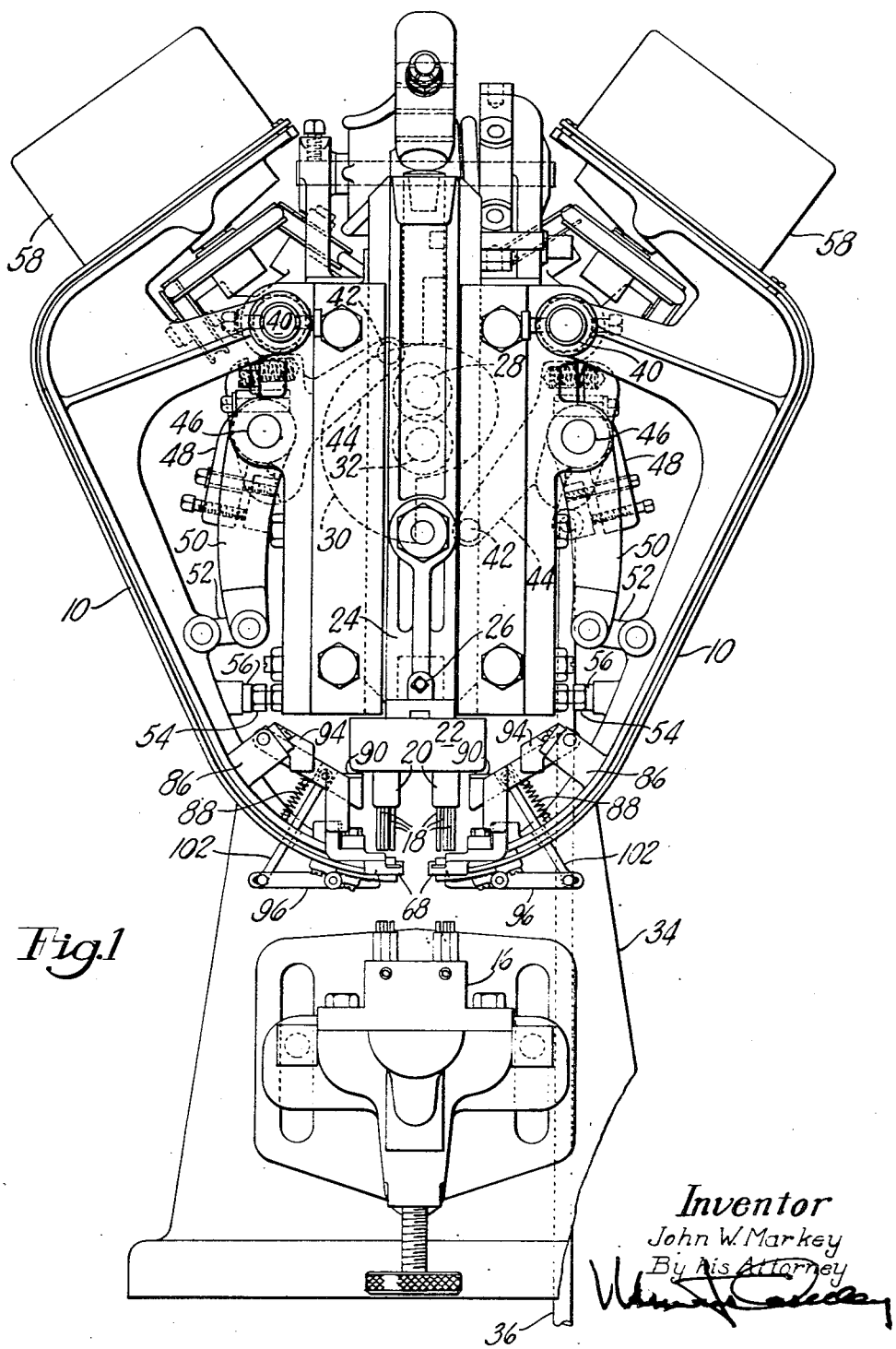

The illustrative machine herein shown is constructed generally as disclosed in United States Letters Patent No. 1,932,420, granted October 31, 1933, upon an application filed in the name of E. S. Nokes, and is designed for the insertion and clenching of a plurality of eyelets simultaneously. It will be understood that the Nokes disclosure of percussion mechanism for striking a clench tightening blow has no necessary relevance to the invention about to be described and may be disregarded. It will also be clear that for the purposes of the present invention non-cylindrically barreled fasteners as well as cylindrical types may be employed assuming that the upsetting tools are of appropriate corresponding shape and that the fastener bodies are elongated transversely of their barrels. In this instance the elongated fasteners, which the illustrative machine is adapted to install four at a time, are double barreled eyelets E, or as they are sometimes called "twin eyelets" (Figs. 2, 3, 4, 5) which must be installed with precision in predetermined angular relation in a flat workpiece W (Figs. 2 and 3). Double impaling pins and setting tools are accordingly here required for each fastener although the invention contemplates the use of but single impaling pins for operation on other elongated fasteners having one barrel. The suitably prepunched workpiece W is a typical example of the problems to the solution of which this invention is directed. It is to have one pair of eyelets E installed in aligned relation as indicated in Fig. 3 and they need not be oriented after they arrive at the delivery ends of inner tracks of a pair of confronting raceway units 10, 10 (Figs. 1 and 3) but will be described as being handled in conventional manner to contrast with the novel means for simultaneously and angularly installing the other pair of twin eyelets.

The construction, arrangement, and operation of both raceway units 10 and their associated fastener inserting mechanisms (i. e., roughly the right and left halves of the machine) being similar, it will suffice if a brief description be limited to one (the one on the right as viewed in Fig. 1) of them, it being understood that the delivery ends of the raceway units are moved toward and from each other. The illustrative machine is provided with two gangs of four stationary anvils or upsetting tools 11, 12, 13 and 14 (Fig. 7) affixed in a block 16 and arranged, respectively, to support the work W in fastener receiving position, and to cooperate with fastener impaling pins or spindles 18 telescopically mounted in upsetting caps 20, 20 (Fig. 1). The latter are affixed to a vertically movable plunger block 22 carried by a plunger 24, an upwardly projecting stem formed on the block being secured in a socket in the plunger by a setscrew 26 (Fig. 1). The plunger is reciprocated vertically by a crank or wrist pin 28 to which it is connected by a link (not shown). The crank 28, carried by a cam 30 the purpose of which need not here be discussed, is actuated by a horizontal operating shaft 32 journaled in bearings in a main frame 34 and affixed to said cam. The shaft 32 may be driven by a continuously rotatable pulley (not shown) having suitable clutch connection therewith and controlled via a treadle rod 36 (Fig. 1). The spindles 18 being adapted to be threaded into the small barrels of the eyelets E may have diameters of the order of .040″ and are spring backed to enable them to recede within the set cap 20 during clenching of a fastener, as indicated in Fig. 9.

Each raceway unit 10 is connected to the frame 34 by a horizontal supporting pivot 40 (Fig. 1) and oscillated by its own chain of mechanism about its pivot 40 as fully described in said Nokes patent. Thus a closed groove cam (not shown) on the shaft 32 receives a cam roll 42 carried by an arm 44. The arm 44 is loosely mounted on a horizontal rockshaft 46 journaled in the frame 34 and transmits motion from the groove cam to the rockshaft by means of a member 48 rigidly secured to the rockshaft. Rocking motion of the latter is communicated positively to the raceway unit by connections comprising an arm 50 and a link 52. Accurate registration of the delivery end of the raceway unit with the fastener inserting tools is insured by a stop 54 in the form of a bolt screwed into the frame and provided with a head against which abuts a boss 56 on the raceway unit. A hopper 58 at the top of the unit holds a supply of the fasteners E to be fed down channels or tracks 60, 62 (Fig. 3) provided in the raceways.

The inner tracks 60, 60 are in conventional form as shown in Fig. 3, spring pressed retaining fingers 64, 64 respectively pivotally mounted on the inner sides of the units 10, 10 being provided yieldingly to engage the endmost fasteners and thus prevent the inner tracks from being emptied as the fasteners slide downward under the influence of gravity. When the delivery ends of the raceway units 10, 10 arrive in fastener presenting position as indicated in Figs. 1, 2 and 3 no orientation or deflecting of fasteners E needs to occur in the inner tracks 60, 60. The four inner spindles 18 arranged in a line are thrust downwardly, the two on the right side of the machine impaling the barrels of the endmost fastener E on the right raceway and the two spindles on the left impaling the endmost fastener E on the left raceway. The units 10, 10 retract sidewise and away from one another after all the spindles 18 have descended vertically together for the impaling action but before descent of the set caps 20, 20 can interfere therewith. Consequently the fingers 64, 64 are yieldingly pivoted to permit them momentarily to clear the delivery ends of the inner tracks 60 for the complete separation from the units 10, 10 of the impaled fasteners therein by their corresponding spindles 18 and the latter to deposit their fasteners on the anvils 11 and 12 for clenching action by the set caps 20, 20.

Meanwhile the delivery ends of the outer tracks 62 are required, respectively, to position their endmost fasteners E angularly and these ends are accordingly provided with offset portions 66, 66, respectively, against which the leading portion of each fastener may bear. Since the lead portion of a double barreled eyelet comprises a barrel, the means provided for deflecting or guiding each fastener against a portion 66 consists of a deflecting finger 68 having a groove 69 for accommodating an eyelet flange or crown and a guide surface 70 adapted to engage and deflect said lead barrel from its previous course. It will be understood that for lead portions of different shape it may be desirable to alter either or both the contour of the deflecting end of a finger 68 and of the portion 66 suitably to engage and guide the advanced portion of an endmost fastener for cooperative positioning as may be desired.

Each finger 68 is mounted between its ends on a pivot 72 supported by a raceway unit 10 and is positively actuated in timed relation to the outer spindles 18 and the raceway as will now be described. A spring 74 (Figs. 4 and 8) seated in a raceway unit engages the finger 68 yieldingly to urge its deflecting end into fastener engaging position, the surface 70 extending into the track 62. Acting on the finger 68 in opposition to the spring 74 is a block 76 having a cam surface 78 (Fig. 8) arranged to cooperate with a cam surface 80 formed on the finger 68. The block 76 is carried by a lever 82 having one end pivotally supported on a pin 84 secured in a lug 86 integral with the raceway unit 10. A compression spring 88 having one end engaging the unit 10 also bears on the lever 82 normally to maintain the cam block 76 elevated relatively to the surface 80, but the spring 88 is compressible when an end portion 90 of the lever 82 is depressed by engagement therewith of a projecting cam portion 92 of the plunger block 22 as shown in Fig. 7. A member 94 screwed to the lug 86 acts as a stop to limit upward movement of the lever 82 under the influence of the spring 88. It will thus be seen that downward movement of the plunger 24 acts through the resultant cooperation of the cam surfaces 78 and 80 positively to swing the fastener deflecting end of the finger 68 out of and away from the track 62, the arrangement preferably being such that this occurs just after an endmost fastener has been impaled by its spindles but just prior to retraction of the raceway unit thereby avoiding the imposition of lateral strain on the spindles. It will be noted that this swinging movement of the finger 68 does not disturb the positioned fastener, and would not do so though it had been impaled by but a single spindle 18.

Since the elongated fasteners to be installed by the machine in other workpieces may be of different lengths and shapes, independently actuated means is provided for intermittently retaining and releasing each next to the endmost fastener in its track 62. Retention occurs until the deflected endmost fastener has been transferred on its spindles 18 and the fastener positioning end of the finger 68 has had opportunity to be swung back into the delivery end. For thus operating in time relation to track clearing movements of the finger 68, a retaining finger 96 (Figs. 1 and 5) has an upwardly projecting tip 98 (Fig. 5) arranged to engage a leading portion of the next to the endmost fastener. The finger 96 is pivotally mounted beneath the raceway unit on a bearing pin 100 supported thereby. Connected pivotally to the finger 96 is a link 102 extending upwardly through a hole in the raceway for connection with an operating lever 104 (Fig. 8) (usually of substantially parallel inclination to that of the lever 82) pivotally mounted at one end on the pin 84. The lever 104 has a cam portion 106 extending for cooperation with a cam portion 108 (located rearwardly of the portion 92 in Fig. 7) of the plunger block 24 so that downward movement of the latter positively moves the tip 98 upward into fastener retaining position. A compression spring 110 engaging the unit 10 and bearing on the lever 104 is thus loaded during downward pivotal movement of the lever 104 relative to the raceway and accordingly enables the finger tip 98 to release the next to endmost fastener into the endmost position for angular deflection as soon as the plunger block 24 raises its set caps 20, 20 from clenching action on the preceding fasteners. The cam portions 92 and 108 of the plunger block 24 may obviously be formed integral therewith, if desired, or adjustably mounted thereon to afford increased adaptability of a particular machine to various operating conditions.

Upon entering the offset portion 66 a fastener is caused to assume the desired angularity, in this case the same as that of its corresponding impaling spindles 18, by reason of the angular guide surface 70 deflecting and holding its advance portion in contact with the portion 66 while a trailing portion is nested in the track 62. Thus accommodated, the predetermined positioning of the endmost fastener is obtained as desired and enables the spindles 18 to impale both the oriented as well as the non-deflected double-barreled eyelets and transfer them without danger of fouling to the prepunched holes in the workpiece W and to the anvils 11, 12, 13 and 14 for upsetting. With the four fasteners thus simultaneously inserted and clenched the workpiece is removed to make way for another and operation of the machine is repeated.

Having thus described my invention, what I claim as new and desired to secure by Letters Patent of the United States is:

1. In a machine for inserting tubular fasteners, a pair of cooperative upsetting tools, a reciprocable plunger for carrying one of said tools toward and from upsetting relation with the other, an oscillatory raceway for presenting fasteners one at a time to the path of said one tool, a finger pivotally mounted on the raceway and having a fastener deflecting surface normally disposed forwardly of said raceway to engage an endmost fastener in said raceway for retaining it therein, and mechanism operated by said plunger for positively moving said finger to shift said deflecting surface away from fastener engaging position.

2. In a machine for inserting tubular fasteners, a pair of cooperative upsetting tools, a reciprocable plunger for carrying one of said tools toward and from upsetting relation with the other, said one tool having a yieldable, impaling spindle normally projecting toward the other tool, an oscillatory raceway for presenting fasteners one at a time to the path of said spindle, a finger pivotally mounted on the raceway and having a fastener deflecting surface normally disposed forwardly of said raceway to engage an endmost fastener in said raceway for retaining it therein, and mechanism including a cam operated by said plunger for positively moving said finger to shift said deflecting surface away from fastener engaging position.

3. In a machine for inserting tubular fasteners, a pair of cooperative upsetting tools, a fastener impaling spindle respectively movable with respect to said upsetting tools, an oscillatory raceway unit having a track arranged and adapted to supply fasteners one at a time to the path of the impaling spindle, the delivery end of said track having an offset portion, and a finger mounted on the raceway unit for yieldingly engaging the endmost fastener in said track, said finger having a deflecting surface projecting into said offset portion and adapted to impart positioning movement to said fastener before it is impaled.

4. In a machine for inserting tubular fasteners, a pair of cooperative upsetting tools, a plunger for carrying said tools into and out of clenching relation, an impaling spindle mounted for telescoping movement in one of said tools, an oscillatory raceway unit having a track for supplying fasteners one at a time to the spindle, said track having its delivery end portion enlarged to receive the leading portion of an endmost fastener therein, a pivotal finger mounted on said raceway having an angular end portion adapted to extend into said enlarged track portion to deflect the leading portions of successive endmost fasteners before they are impaled by the spindle, a pivotal finger mounted on the raceway for retaining successive next to endmost fasteners prior to the entry into said enlarged delivery end portion, and independent means for positively actuating the respective fingers in time relation to the movement of said raceway and plunger.

5. In a machine for inserting a plurality of elongated tubular fasteners at substantially the same time and in angular and adjacent relation, a plurality of pairs of cooperative setting tools, a plurality of fastener impaling spindles respectively movable with respect to said setting tools, an oscillatory raceway unit having tracks arranged and adapted simultaneously to supply fasteners one at a time to the paths of the respective impaling spindles, the delivery end of one of said tracks having an offset portion, fingers mounted on the raceway unit for yieldingly engaging the respective endmost fasteners in said tracks, the finger engaging the fastener extending in said offset portion having a deflecting surface projecting therein and adapted to impart positioning movement to said fastener before it is impaled.

6. In a machine for inserting a plurality of elongated tubular fasteners at substantially the same time and in angular and adjacent relation, a plurality of pairs of cooperative upsetting tools, a plunger for carrying said tools into and out of clenching relation, a plurality of impaling spindles respectively mounted for telescoping movement in a tool of each pair, an oscillatory raceway unit having a plurality of tracks for simultaneously supplying fasteners one at a time to the respective spindles, one of said tracks having its delivery end portion enlarged to receive the leading portion of an endmost fastener therein angularly relatively to an endmost fastener in an adjacent track, a pivotal finger mounted on said raceway having an angular end portion adapted to extend into said enlarged track portion to deflect the leading portions of successive endmost fasteners before they are impaled by a spindle, a pivotal finger mounted on the raceway for retaining successive next to endmost fasteners prior to their entry into said enlarged delivery end portion, and independent means for positively actuating the respective fingers in time relation to the movements of said raceway and plunger.

References Cited in the file of this patent

UNITED STATES PATENTS

| | | |
|---|---|---|
| 1,567,882 | White | Dec. 29, 1925 |
| 1,722,286 | Gookin | July 30, 1929 |
| 1,932,420 | Nokes | Oct. 31, 1933 |
| 2,497,899 | Monson | Feb. 21, 1950 |

FOREIGN PATENTS

| | | |
|---|---|---|
| 542,765 | Great Britain | Jan. 27, 1942 |